D. L. NEWCOMB & H. A. BROOKS.
MECHANICAL BALLOT.
APPLICATION FILED OCT. 25, 1904.

969,718.

Patented Sept. 6, 1910.

3 SHEETS—SHEET 1.

Witnesses:-
Frank L. A. Graham
G. T. Hackley

Inventors,
David L. Newcomb.
Harry A. Brooks.
by Townsend Bur., atty.

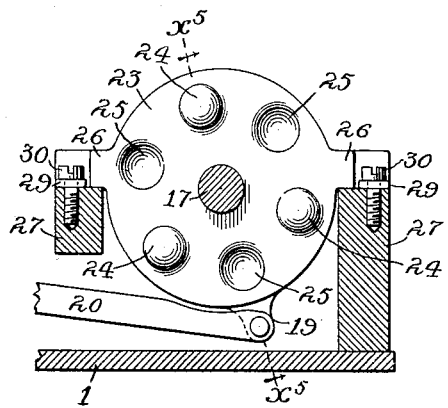
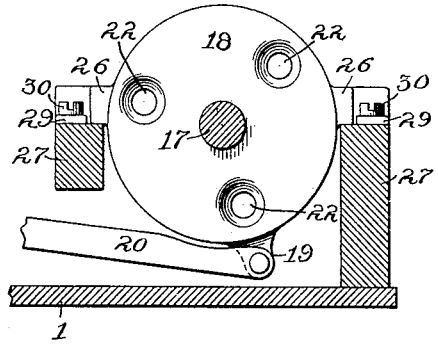
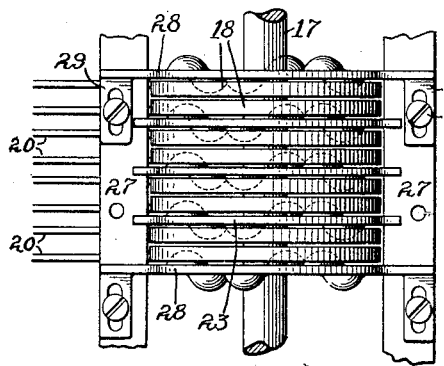
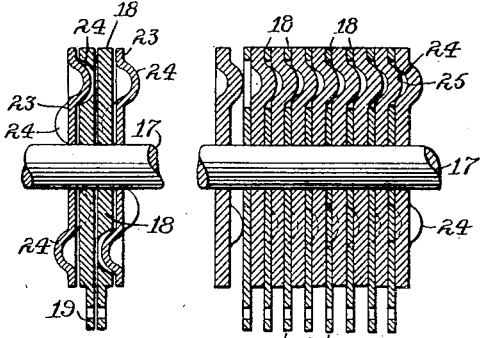
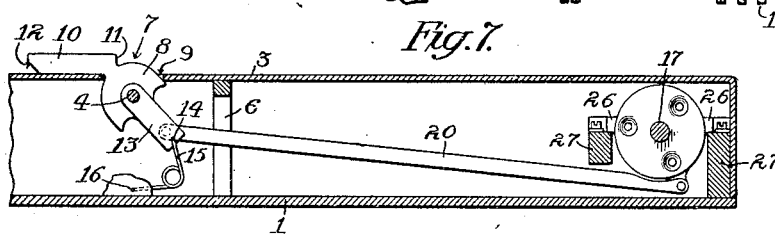
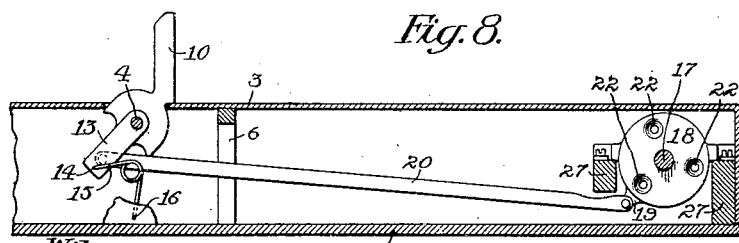

D. L. NEWCOMB & H. A. BROOKS.
MECHANICAL BALLOT.
APPLICATION FILED OCT. 25, 1904.

969,718.

Patented Sept. 6, 1910.
3 SHEETS—SHEET 3.

Witnesses:—

Inventors,
David L. Newcomb.
Harry A. Brooks.
by Townsend Bros.
attys.

UNITED STATES PATENT OFFICE.

DAVID L. NEWCOMB, OF SAN DIEGO, AND HARRY A. BROOKS, OF LOS ANGELES, CALIFORNIA; SAID BROOKS ASSIGNOR TO SAID NEWCOMB.

MECHANICAL BALLOT.

969,718.   Specification of Letters Patent.   Patented Sept. 6, 1910.

Application filed October 25, 1904. Serial No. 229,998.

*To all whom it may concern:*

Be it known that we, DAVID L. NEWCOMB, a citizen of the United States, and HARRY A. BROOKS, a subject of the King of Great Britain, the former residing at San Diego, in the county of San Diego and State of California, and the latter residing at Los Angeles, in the county of Los Angeles and State of California, have invented a new and useful Mechanical Ballot, of which the following is a specification.

This invention relates to a portable ballot which is provided with movable members adapted to be operated by the voter for indicating the choice of candidates. The ballot, after having been prepared by the voter is adapted to be placed in a suitable machine which registers the vote according to the position occupied by the movable members as prepared by the voter.

The invention includes means, (which may readily be set at the limit desired previous to the voter's preparation of the ballot) whereby a certain number of movable members or tappets in a definite block on the ballot may be freely operated by the voter, irrespective of sequence or position, for cumulative voting, provision being made for segregating one or more sections of the ballot which it may be desired to vote cumulatively. When one or more sections of the ballot have been so set aside for cumulative voting, the remainder of the ballot is still adapted for the regular segregative voting; and the main object of the present invention is to provide a simple, effective and positively-acting mechanism for accomplishing the foregoing, which is light, strong, accurate, easily manipulated, and proof against fraudulent operation.

Figure 9:
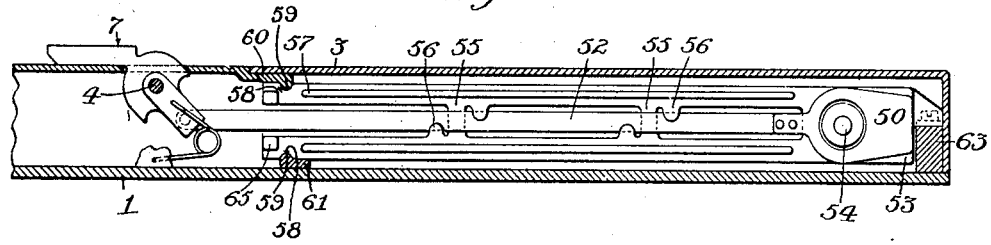
Figure 10:
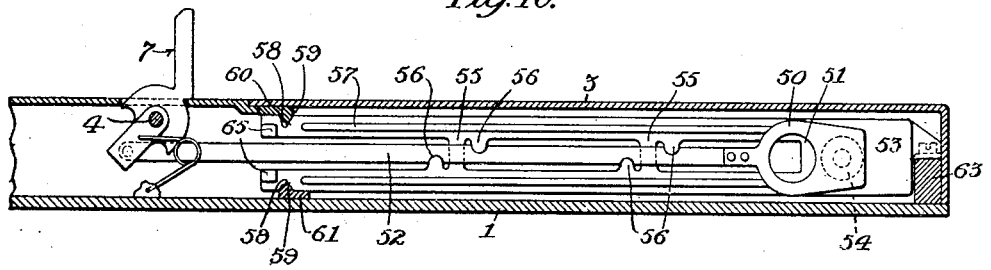
Figure 11:
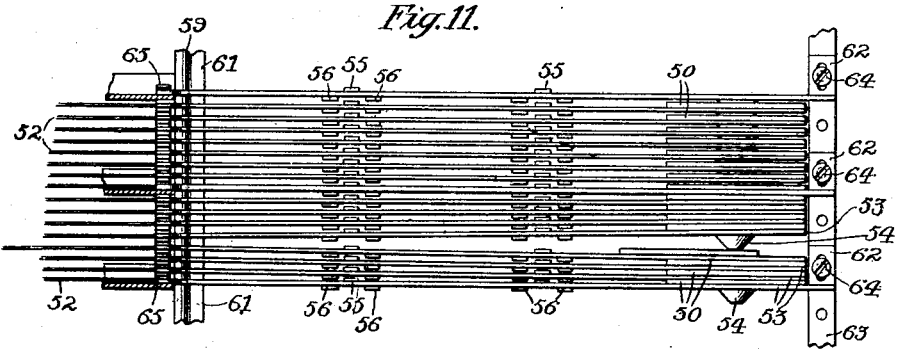
Figure 12:
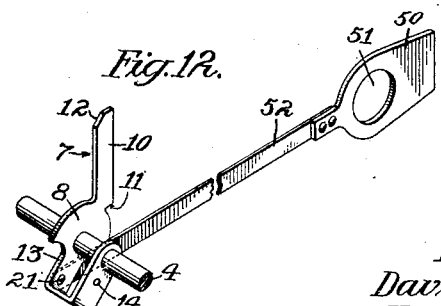

The accompanying drawings illustrate the invention, and referring thereto:—Figure 1 is a plan view of a ballot with the tappets depressed in the position they have before being manipulated by the voter. A part of the top plate of the ballot is removed to show the interior mechanism in plan. Owing to the size of the view and smallness of certain detail features, and owing to the thinness of the trackers, single lines have been used to represent the trackers, and certain features of the interlocking devices have been omitted to prevent blurring of the lines. These details are clearly shown in other figures of the drawing. The view illustrates the general arrangement of the tappets, interlocking devices and connecting trackers. Fig. 2 is a side elevation of a spreader-plate, its supporting elements being shown in section. Fig. 3 is a side elevation of a rocker-plate showing a portion of the end of a tracker attached thereto with the supporting elements shown in section. Fig. 4 is a plan view of a group of rocker-plates and spreader-plates with the two dividers which embrace them. Fig. 5 is a section on line $x^5$—$x^5$, Fig. 2. Fig. 6 is a view similar to Fig. 5 showing a modified form in which thin rocker-plates are employed and the spreader-plates are nested one within another. Fig. 7 is an enlarged vertical, sectional view taken through one end of the ballot and includes but the nearest tappet and shortest tracker; the tappet is shown depressed. Fig. 8 is a view similar to Fig. 7 showing the tappet raised. Fig. 9 is a view similar to Fig. 8 illustrating another form of interlocking device; the tappet is shown depressed. Fig. 10 is a view similar to Fig. 9 showing the tappet raised. Fig. 11 is a plan view showing the arrangement of the features embraced in the form shown in Fig. 10, the raised tappet having shifted one spreader-plate. Fig. 12 is a perspective view of a tappet, the spreader-plate and connecting tracker.

The ballot comprises a thin rectangular box having a bottom plate 1, side walls 2 and top-plate 3. A series of eight tappet-shafts 4 extend through the box, as shown, the ends of the shafts 4 being mounted in the side walls 2 and the shafts being supported at intermediate points by ribs or partitions 5. The partitions 5 make contact with both the top and bottom plates and serve to strengthen the ballot. In the present embodiment these partitions do not extend the entire length of the ballot, but are fastened at one end to a comb 6 which lies at right angles to the trackers. Pivoted on the shafts 4 are tappets 7; each tappet comprises a substantially semi-circular plate 8 the edge of which is curved concentrically with the shaft 4 and which serves to close a slot 9 formed in the top-plate 3.

A finger 10 projects from the plate 8, and when the tappet is in one position the finger lies flat upon the top plate 3, as shown in Fig. 7, and when the tappet is raised its shoulder 11 rests upon the top plate 3, as shown in Fig. 8, thus limiting the movement of the tappet to 90°. The end of the finger 10 is beveled as at 12 so that the tappet may readily be lifted by the voter. A U-shaped strap 13 is formed preferably integral with the other part of the tappet and one of its arms is perforated concentric with a similar perforation in the disk 8 to form a wide or double bearing for the tappet.

One of the arms of the U 13 has a perforation 14 which receives one end of a spring 15, the other end of the spring 15 being inserted in a perforation 16 formed in the adjacent rib 5. The perforation 16 is located below the shaft 4 and in vertical alinement therewith; thus, when the tappet is swung so that the perforation 14 lies to either side of the vertical line which intersects the shaft 4 and the perforation 16, the spring 15 will snap the tappet into its raised or depressed position accordingly. Thus, if the tappet is raised a trifle more than half way it will be moved into its upright position by the spring. This insures a perfect positioning of the tappet and requires no special care on the part of the voter, it being required only that the voter raise the tappet sufficiently far for the spring 15 to act.

In the present embodiment, as shown in Fig. 1, there are eight vertical rows of tappets, one row for each political party. The number of horizontal rows of tappets may be arranged as desired to accommodate the number of offices to be filled under the respective parties. The ribs 5 may preferably be arranged to separate each horizontal row of tappets.

Extending through the box near one end is a shaft 17, and mounted to rock upon the shaft 17 are rocker-plates 18 each of which has an ear 19 to which a tracker 20 is pivotally connected, and each tracker 20 is pivoted at its other end to the U-shaped bar 13 of a tappet, the latter having a perforation 21 (see Fig. 12) for receiving the pivot of the tracker. Each rocker-plate 18 is provided with perforations 22 which are countersunk or cupped preferably concave. In the present embodiment each rocker-plate 18 has three perforations 22 which are spaced 120° apart, as shown in Figs. 3, 7 and 8. The trackers 20 extend through the comb 6, being guided thereby, and are graded in length according to the position of the tappet with which they connect. Thus, referring to Fig. 1, the extreme lowest rocker-plate at the bottom of the figure is connected with the farthest tappet to the left so that its tracker will be the longest; the next rocker-plate is connected to the next nearest tappet and hence has a shorter tracker; the next, or third rocker-plate from the bottom is connected to the third tappet from the left and hence has a still shorter tracker, and so on; the eighth rocker-plate in the group from the bottom being connected to the nearest tappet and having the shortest tracker.

The rocker-plates 18 are arranged in pairs, as shown in Figs. 4 and 5, so that the concave perforations 22 of one divider-plate face oppositely from the concave perforations of its mate (see Fig. 5), and between each pair of rocker-plates 18 is a spreader-plate 23. These spreader-plates 23 are, like the rocker-plates, preferably formed of sheet metal and are pressed up by suitable dies so as to provide convex warts or knobs 24; each knob being pressed up from the plate is therefore concavo-convex, and there are three knobs projecting from each side of the spreader-plate, the set of three knobs on one side being spaced 120° apart from the set of three knobs on the other side, as shown in Fig. 2. There are thus formed on each face of each spreader-plate three knobs 24 and three concave depressions 25. The knobs 24 of a spreader-plate are adapted to nest within the concavities 22 of the adjacent rocker-plate, as shown in Fig. 4.

The spreader-plates 23 are provided with short lugs 26 which rest upon the bars 27 to prevent the spreader-plates from being displaced when the rocker plates are being operated by turning said plates on the shaft 17, although they may freely slide longitudinally thereon. The rocker-plates are segregated into groups of eight, the eight rocker-plates of a group being associated with its respective horizontal row of tappets, by means of divider-plates 28, each divider-plate being constructed similarly to a spreader-plate excepting that it has slotted feet 29 which are fastened to the bars 27 by screws 30.

For ordinary segregative voting the divider-plates 28 are so adjusted as to permit of one only of the rocker-plates being turned on the shaft 17 to raise the knobs 24 of the adjacent spreader-plate out of the concave perforations 22 in the rocker-plate so that the knobs 24 of the spreader-plate will rest against the flat face of the rocker-plate.

Considering a single group of rocker-plates, when all of the tappets related with that group are down, the knobs of all of the spreader-plates in that group register with the concavities of the rocker-plates in the group and nest more or less closely therein, and at such time if all the rocker-plates and spreader-plates in the group were crowded together the length of the space occupied by them would be less than the distance between the two divider-plates. The length of this free space is equal to the height of a knob 24 measured from its base to its tip. When any one of the rocker-plates is turned, by raising a tappet, the knobs 24 of the adjacent spreader-plate are forced out of the concavities of the rocker-plate and the spreader-plate and rocker-plate are both spread apart, each sliding along the shaft 17 so that the space between the two divider-plates embracing the group is completely filled. It is then impossible to raise another tappet to turn another rocker-plate. Thus, referring to Fig. 4, if the tappet connected to the uppermost tracker is raised, it will turn the top rocker-plate and cause it to be pushed down on the shaft 17 as its concavities rise over the lower knobs of the divider-plate 28, which will squeeze all of the rocker-plates and spreader-plates below it so that all of the rocker-plates and spreader-plates completely fill the space between the upper and lower divider-plates. If another tappet had been raised to pull the fourth tracker from the top then the fourth rocker-plate from the top would be turned and the three rocker-plates and one spreader-plate which lie above that rocker-plate would be squeezed toward the upper divider-plate 28, while the four rocker-plates and two spreader-plates which lie below that rocker-plate would be squeezed toward the bottom divider-plate 28, so that the space between the two divider-plates 28 is completely filled. Obviously, the turning of any one of the rocker-plates in the group irrespective of its position in the group will result in spreading the rocker-plates and spreader-plates so that the space between the two divider plates is completely filled. Thus, for each group of rocker-plates and divider-plates on the shaft 17 one tappet in each horizontal row of tappets associated with that group may be erected. In this manner segregative voting is carried out, it thus being possible to raise the entire number of tappets in a vertical row which lies under any one of the parties, or to raise one tappet in each horizontal row, according as the voter may desire to vote a straight ticket or a mixed ticket.

For cumulative voting the divider-plates 28 are loosened so that they may slide freely upon the shaft 17, and when thus loosened they act precisely in the same manner and perform the same functions as the spreader-plates, and as many of the divider-plates may be loosened as is necessary to provide for the necessary free space. Thus, in cumulative voting, as in voting for presidential electors, judges, supervisors, school-boards or trustees, and the like, the ballot is set before being put in use, by loosening some of the divider-plates to throw two or more groups or rocker-plates and spreader-plates into one large group in which the respective plates are all associated in a single series; as many divider-plates, less one, being loosened as there are to be elected candidates. This will form a block of tappets opposite the series of associated plates in which tappets may be raised to the number limited by the allowed spreading space confining the associated plates.

The names of the electors or other candidates are placed on the face of the ballot next to the tappets as in segregative voting, but obviously, there may be more tappets in the block thus set aside than there are electors to receive the vote; in such event, only certain of the tappets will have names of electors, while the rest may be left blank. In the block of tappets thus formed for cumulative voting, tappets may be raised promiscuously until the limit has been reached, at which time the rocker-plates and spreader-plates in the associated series have been spread so that they completely fill the allotted space between the two confining dividers. If there are some blank tappets on the block and a voter raises some of them, they will not count except in a negative way as votes for electors can only be secured by raising tappets which are named, the machine in which the ballot registers the vote being set so as to count votes under the candidates named only, and not under blank tappets. For example, if there are ten electors to be elected, nine divider-plates are loosened, which in the ballot shown will place ten groups of eighty rocker-plates in the aggregate into a single series. As for each original group of eight rocker-plates sufficient space was allowed for the turning of one rocker-plate, so now there is sufficient space to allow of turning ten rocker-plates; therefore, ten tappets may be raised. The tappets raised may be in a bunch or they may be scattered. If in the present case the first horizontal row of tappets and two tappets in the next row below are raised to complete the ten, the first ten rocker-plates at the top of the ballot will be turned, and as the tappets are raised one after another by the voter the spreading action is gradually transferred down through the entire eighty rocker-plates and intervening spreader-plates so that the raising of the last tappet will just fill the bottom gap in the series of rocker-plates.

When a rocker-plate is turned its resulting sidewise movement carries the end of its tracker slightly out of direct alinement with its other end, which obviously lengthens the tracker distance between the rocker-plate and tappet. While in segregative voting this lateral movement of a tracker is practically negligible, it has to be provided for in cumulative voting, especially in the case just mentioned, as the lateral movements of the trackers gradually increase toward the lower rocker-plate, the resulting shortened tracker distance of the last-named tracker being appreciable. Therefore, a slight amount of free motion is allowed between the knobs of a spreader-plate and the respective concavities within which they nest, so that as the tracker distance shortens the rocker-plates can turn slightly without causing the spreading action, and sufficient of this free motion is allowed so that the lower cam will sustain its necessary lateral movement and be allowed to turn the resulting requisite distance before the wall of its concavity strikes against the knob.

After the tappets have been set by the voter, which is preferably done in secrecy, the voter places a suitable cover over the ballot which hides the face and he hands it to the proper official who places the ballot in a suitable machine which registers the vote according to the setting of the tappets, and incidentally, automatically restores the tappets so that when the ballot is taken from the machine its appearance is normal, giving no clue, even to the official, of the vote. The ballot is then ready for another voter. As the preparation of a ballot by a voter, on the average, takes several times longer than the time consumed when the ballot is in the machine, by supplying several voters each with a ballot, voting is greatly facilitated and is carried on with comparatively inexpensive apparatus.

Fig. 6 shows a slightly modified form in which the rocker-plates 18 are made thinner, so that the knobs 24 of one spreader-plate project through the orifice in the rocker-plate and nest within the concavities 25 of another spreader-plate. When a rocker-plate is turned the same spreading effect is secured as by the previous described construction. The thin rocker-plates secure a much more compact mechanism, occupy much less space, and produce a lighter ballot.

Figs. 9 to 12 inclusive illustrate another form of interlocking device in which slidable plates are employed in place of revoluble plates, the generic nature and the principle of operation, however, being common to both the reciprocating and revoluble types. In this form the shaft 17 is dispensed with. Each shift-plate 50 is provided with a circular orifice or aperture 51, the plate being riveted or otherwise fastened to a tracker 52 which may connect with its tappet in the manner heretofore described. Interposed between each shift-plate 50 is a spreader-plate 53 having a conical projection 54 which nests within the orifice 51 of a shift-plate. The spreader-plates 53 comprise long, thin strips preferably of sheet metal which are punched out from sheet metal and have bridges 55 and ears 56. A tracker 52 extends longitudinally of a spreader-plate and is supported thereby, one side of the tracker resting against the bridges 55, the ears 56 lapping over the other side of the tracker to hold it in place and yet allow the tracker to freely slide along the spreader-plate. In order to stiffen the spreader-plate slight ribs 57 may be formed longitudinally thereof by pressing up the material. The bridges 55 are slightly offset to one side of the spreader-plate 53 and the ears 56 are slightly offset to the other side of the spreader-plate so that the tracker will lie completely between the side faces of the spreader-plate in perfect alinement therewith. As each shift-plate 50 is riveted to the tracker 52 the necessary offset to the shift-plate is secured so that it may lie flush against the flat face of the spreader-plate. The end of a spreader-plate which lies nearest the tappets is forked, although obviously, its forked end might be strengthened by an offset bridge, if desired, similar to the bridge 55. The upper and lower edges of the forked end of the spreader-plate have rounded notches 58 which engage beads 59 forming part of strips 60 and 61, the strip 60 being attached to the underside of the top plate of the ballot, and the strip 61 being attached to the upper side of the bottom plate of the ballot. Every eighth spreader-plate is made somewhat longer, forming what may be termed a divider-plate, and is provided with a slotted foot 62 which is fastened to a bar 63 by a screw 64. Thus, between two fixed divider-plates there are eight shift-plates forming a group. The conical knob 54 of the top divider-plate (Fig. 11) projects into the orifice 51 of the upper shift-plate 50, while the conical knob 54 of the next lower divider-plate projects into the orifice in the shift-plate in the next lower group. Sufficient space is allowed between the two divider-plates to permit of only one shift-plate in a group being shifted so that the nested knob 54 of the adjacent spreader-plate will be lifted to the flat face of the shift-plate so that the shift-plates and spreader-plates between the two dividers will be spread apart to completely fill the space between the two divider-plates. In order to hold the other ends of the spreader-plates in position small lips 65 are turned up from the corners of each spreader-plate, as shown in Figs. 10 and 11, the lips 65 of one spreader-plate resting flat against the lips 65 of the adjacent spreader-plate.

Referring to Fig. 11, the fourth tracker from the bottom in the bottom group is shown shifted to the left and its attached shift-plate moved accordingly to lift the conical knob 54 out of its seat and squeeze the superposed spreader-plates and shift-plates tight against the middle divider-plate, the shift-plates and spreader-plates below the shifted shift-plate also having been squeezed into contact with the bottom divider-plate, thus completely filling the space allotted to the group. This construction is very simple and has a very smooth action and is very positive, and as the knob 54 of one spreader-plate is adapted to seat within the orifice 51 of its shift-plate and also to project still farther into the hollow knob of the next lower spreader-plate, great economy of space is attained which is of great advantage in a mechanical ballot. It will readily be seen that the action of this type of interlocking mechanism is substantially identical with the action of the revoluble type before described. For segregative voting the feet 62 are clamped in position so as to hold the divider-plates the requisite distance apart to permit the shifting of one shift-plate only in each group; while for cumulative voting, as many of the divider-plates are loosened as is required to provide the necessary space for raising the required tappets, as described with relation to the revoluble type before described. One of the greatest advantages of this longitudinal type of shift-plate arises in cumulative voting. When a large number of shift-plates have been actuated the spreading effect results in swinging the spreader-plates laterally on their fulcrum, the beaded bars 60 and 61, the trackers being carried with the spreader-plates as they swing. The trackers are thus bent slightly in a curve and for that reason it is preferred to not employ a guide-bridge and ears on the spreader-plates near their fulcrum, but to leave the trackers free at that point so that they may have a gradual free curve. The fact that a tracker is thus curved somewhat in cumulative voting does not cause any binding or undue friction that can be felt in raising a tracker.

In the revoluble type before described the angular pull of a tracker on the rocker-plate cants the rocker-plate and causes it to bind on the shaft, and while this friction thus produced between the rocker plate and shaft is slight, still it is not desirable, and in this respect the superiority of the reciprocating type is apparent, as parallelism is substantially maintained at all times between a shift-plate and spreader-plate which promotes smooth and easy action.

What we claim is:—

1. A set of spreader plates, a set of plates slidably mounted on the spreader plates, the plates of each set having face formations for spreading plates apart when a slidable plate is shifted.

2. A set of spreader plates, a set of plates slidably mounted on the spreader plates, the plates of each set having face formations for spreading plates apart when a slidable plate is shifted, and means for detachably holding certain of the spreader plates from swinging laterally.

3. A set of laterally-swinging spreader plates, each plate having a conical projection, plates slidably mounted on the spreader plates, the slidable plates having orifices for receiving the conical projections, a plurality of pivoted tappets and means for sliding said slidable plates.

4. A set of laterally swinging spreader plates, each plate having a conical projection, plates slidably mounted on the spreader plates, the slidable plates having orifices for receiving the conical projections, means for sliding said slidable plates, and means for detachably holding certain of the spreader plates from swinging laterally.

5. A set of bifurcated swinging plates, each plate having an offset bridge and ears, a tracker lying in the same plane with the swinging plate and being supported by the bridge and ears, a shift plate on the tracker and offset therefrom to lie flat against the swinging plate, the swinging plate having a hollow conical projection which lies within an orifice in the shift plate, said hollow conical projection receiving the nose of another conical projection of another swinging plate when the plates are in certain positions.

6. A set of bifurcated swinging plates, each plate having an offset bridge and ears, a tracker lying in the same plane with the swinging plate and being supported by the bridge and ears, a shift plate on the tracker and offset therefrom to lie flat against the swinging plate, the swinging plate having a hollow conical projection which lies within an orifice in the shift plate, said hollow conical projection receiving the nose of another conical projection of another plate when the plates are in certain positions, and a plurality of pivoted tappets, connected with the trackers.

7. A spreader plate comprising a sheet metal bifurcated shank having notches in its end, suitable beaded bars engaging the notches and forming a fulcrum for the spreader plate, lips turned up on the end of the spreader plate for spacing the plates, the other end of the plate having a hollow conical projection stamped up therefrom.

8. A spreader plate comprising a sheet metal bifurcated shank having notches in its end, suitable beaded bars engaging the notches and forming a fulcrum for the spreader plate, lips turned up on one end of the spreader plate for spacing the plates, the other end of the plate having a hollow conical projection stamped up therefrom, a bridge and ears formed integral with the spreader plate, and ribs formed in the spreader plate.

9. An apertured plate, a spreader-plate on each side of said apertured plate, said spreader plates each having a concavo-convex knob normally in line with the aperture in the apertured plate, the convexity of one of said knobs normally extending through said aperture and nesting in the concavity of the other knob, and means for causing a relative movement between said apertured plate and the knob extending therethrough.

10. An apertured plate, a spreader-plate on each side of said apertured plate, said spreader plates each having a concavo-convex knob normally in line with the aperture in the apertured plate, the convexity of one of said knobs normally extending through said aperture and nesting in the concavity of the other knob, means for operating said apertured plate, and means for holding said spreader plates against displacement when said apertured plate is operated.

11. An apertured shift plate provided with a tracker, a spreader plate extending longitudinally along said tracker and having parts embracing said tracker, said spreader-plate being furnished with a projection normally extending through the aperture in said shift plate, and means for moving said tracker longitudinally of said spreader-plate.

12. An apertured shift plate provided with a tracker, a spreader-plate extending longitudinally along said tracker and having parts embracing said tracker, said spreader-plate being furnished with a hollow conical projection normally extending through the aperture in said shift plate, and means for moving said tracker longitudinally of said spreader-plate, said projection receiving the nose of another projection of another spreader-plate when the plates are in normal position.

13. A pair of elongated plates, one of said plates having an aperture and the other having a projection normally extending into said aperture, one of said plates adapted to support and guide the other, and means for moving one of said plates longitudinally along the other.

14. A spreader-plate, an apertured shift-plate provided with a tracker, said tracker being supported and guided by said spreader-plate, said spreader-plate being furnished with a projection normally extending through the aperture in said shift-plate, and means for moving said tracker longitudinally of said spreader-plate.

In testimony whereof, we have hereunto set our hands at Los Angeles California this 13th day of October 1904.

DAVID L. NEWCOMB.
HARRY A. BROOKS.

In presence of—
GEORGE T. HACKLEY,
JULIA TOWNSEND.